US 10,296,726 B2

United States Patent
Henderson

(10) Patent No.: US 10,296,726 B2
(45) Date of Patent: May 21, 2019

(54) MULTI-MEDIA CONTENT AT A DIGITAL DOWNLOAD KIOSK

(75) Inventor: James Henderson, Fife (GB)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 12/881,225

(22) Filed: Sep. 14, 2010

(65) Prior Publication Data

US 2012/0066089 A1 Mar. 15, 2012

(51) Int. Cl.
G06Q 30/00 (2012.01)
G06F 21/10 (2013.01)
G06Q 30/06 (2012.01)

(52) U.S. Cl.
CPC .......... *G06F 21/10* (2013.01); *G06Q 30/0607* (2013.01)

(58) Field of Classification Search
USPC ........................................................ 705/51
See application file for complete search history.

(56) References Cited

U.S. PATENT DOCUMENTS

| | | | | |
|---|---|---|---|---|
| 5,629,980 | A * | 5/1997 | Stefik et al. ............... | 705/54 |
| 7,171,662 | B1 * | 1/2007 | Misra et al. ............... | 717/177 |
| 7,287,048 | B2 * | 10/2007 | Bourbonnais et al. | |
| 2002/0007350 | A1 * | 1/2002 | Yen ............................. | 705/52 |
| 2002/0194793 | A1 * | 12/2002 | Bowron ..................... | 52/36.1 |
| 2004/0204954 | A1 * | 10/2004 | Lacko ............... | G06F 19/3462 705/2 |
| 2009/0017855 | A1 * | 1/2009 | Kwon et al. ............... | 455/509 |
| 2009/0076934 | A1 * | 3/2009 | Shahbazi ............ | G06Q 20/102 705/30 |
| 2009/0113116 | A1 * | 4/2009 | Thompson ........... | G06F 13/385 711/103 |
| 2010/0203833 | A1 * | 8/2010 | Dorsey ..................... | 455/41.2 |

FOREIGN PATENT DOCUMENTS

| | | |
|---|---|---|
| EP | 1626536 A2 | 2/2006 |
| WO | 2008021594 A2 | 2/2008 |
| WO | 2008102261 A2 | 8/2008 |

OTHER PUBLICATIONS

International Search Report for EP Patent Application No. 11177725.6, dated Jan. 13, 2012.

* cited by examiner

*Primary Examiner* — John W Hayes
*Assistant Examiner* — John Winter
(74) *Attorney, Agent, or Firm* — Schwegman, Lundberg & Woessner

(57) ABSTRACT

A digital download kiosk network is described. The network comprises: an authorization database including a digital rights management facility; a first digital download kiosk coupled to the authorization database to receive digital rights management data; and a second digital download kiosk coupled to the authorization database to receive digital rights management data, and coupled to the first digital download kiosk in a peer-to-peer manner to share multi-media content therebetween.

15 Claims, 3 Drawing Sheets

MULTI-MEDIA CONTENT AT A DIGITAL DOWNLOAD KIOSK

FIELD OF INVENTION

The present invention relates to improvements in or relating to multi-media content at a digital download kiosk.

BACKGROUND OF INVENTION

A digital download kiosk enables a customer to select, pay for, and then download multi-media content (such as a movie, an audio file, or a video game) to a portable storage device (such as a non-volatile memory card). Once the multi-media content has been downloaded, the portable storage device can be inserted into a suitable reader coupled to a playback device (such as a computer or a television) to allow the customer to view the downloaded multi-media content either indefinitely (if the customer bought the content) or for a limited time period (if the customer rented the content).

Multi-media content is protected by digital rights management (DRM) protection techniques to prevent unauthorized copying thereof and to authorize playing of the content for a time period (which is either indefinite, if purchased; or limited, if rented).

One popular type of multi-media content available at a kiosk is a movie (sometimes referred to as a cinematographic film, or a motion picture). Each movie file is comparatively large (typically at least two Gigabytes per movie for standard resolution, and much more for high resolution).

Customers like to be able to choose from a large range of movies when using a digital download kiosk. This means that it is desirable to be able to access a large catalogue of movies (and potentially other multi-media content). It is not currently practical to store a large number of different movies in a kiosk, so digital download kiosks are typically connected to a content server, which is typically co-located in the same retail outlet as the digital download kiosk. The content server is typically connected by a high bandwidth communications channel (such as T1 or ADSL connection) to a remote authorization and master content database. The movies on the content server can then be updated, and managed from the master content server. The content server transfers files via a high speed LAN or wireless connection to the kiosk in response to a customer's selection.

This arrangement has the disadvantage that the kiosk owner or operator has to pay for expensive, high bandwidth, WAN communication lines. Furthermore, the retailer must also house the content server in its premises (using costly real estate) to provide sufficient multi-media content for the kiosk to be able to attract customers. Bulk new movie releases are typically added by a service engineer visiting the retail location and uploading the new releases to the content server using a portable hard disk drive. This is costly, time-consuming, and can lead to failures because of damage to the electro-mechanical components within the portable hard disk drive.

SUMMARY OF INVENTION

Accordingly, the invention generally provides methods, systems, apparatus, and software for providing multi-media content to a customer at a digital download kiosk by sharing multi-media content between multiple kiosks.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a digital download kiosk network comprising:

an authorization database including a digital rights management facility;

a first digital download kiosk coupled to the authorization database to receive digital rights management data; and a second digital download kiosk coupled to the authorization database to receive digital rights management data, and coupled to the first digital download kiosk in a peer-to-peer manner to share multi-media content therebetween.

Each of the first and second digital download kiosks may include a catalogue listing multi-media content available at either the first or second digital download kiosk. This enables a customer to browse for multi-media content (such as movies) that can be retrieved automatically from either the first or second digital download kiosk.

The authorization database may be located remotely from the first and second digital download kiosks.

The first and second digital download kiosks may be coupled to the authorization database by a dial-up connection, for example, using a cellular radiofrequency transceiver. This avoids the cost of a high bandwidth connection between the authorization database and the kiosks. Alternatively, the first digital download kiosk may be coupled to the authorization database by a high bandwidth connection (which may be permanent) and the second digital download kiosk may be coupled to the authorization database by a dial-up connection. In such configurations, the first digital download kiosk may receive all new multi-media content and may either delete old multi-media content to make sufficient space for the new multi-media content, or may transfer some of the old multi-media content (that is, some files) to the second digital download kiosk to make space for the new multi-media content. This removes the requirement for each kiosk to have its own high bandwidth connection to the authorization database or to a content server. There is no need for a local content server.

The first and second digital download kiosks may be mutually coupled using a high speed, short range, communications system, such as a 60 GHz wireless communication system.

Additional digital download kiosks may be coupled to the first and second digital download kiosks to increase the storage space available, thereby increasing the number of multi-media files that can be stored and provided to customers.

The first digital download kiosk may include a content management application operable to allocate different multi-media packages (comprising one file, or comprising multiple files related to the same multi-media content) to different digital download kiosks.

Where a multi-media package contains multiple files, these files may combine to provide, for example, a movie, a trailer for the movie, interviews with actors in that movie, and the like.

As used herein, a "title" refers to a multi-media package (comprising one or more files), where that multi-media package is sold or rented individually. One example of a title may be an MPEG4 version of a movie, such as "SHREK" (trade mark).

According to a second aspect there is provided a method of providing multi-media content in playable form to a customer, the method comprising:

receiving at a first digital download kiosk information from a second digital download kiosk about the multi-media content stored on the second digital download kiosk;

providing information to a customer at the first digital download kiosk about multi-media content stored on either of the first or second digital download kiosks;

receiving a request from the customer to download multi-media content stored on the second digital download kiosk;

retrieving the requested multi-media content from the second digital download kiosk;

retrieving digital rights management data from a remote authorization database;

applying the digital rights management data to the retrieved multi-media content to create playable multi-media content; and copying the playable multi-media content to a portable storage device provided by the customer.

The step of receiving at a first digital download kiosk information from a second digital download kiosk about the multi-media content stored on the second digital download kiosk may be implemented using a short range, high bandwidth, wireless communication technology, such as 60 GHz transmission technology.

The step of providing information to a customer at the first digital download kiosk about multi-media content stored on either of the first or second digital download kiosks may be implemented so that the location of the multi-media content is hidden from the customer. In other words, the customer is unaware that some of the content is located on a different digital download kiosk to the kiosk that the customer is using. Alternatively, the customer may be informed about the location of each multi-media package.

The word "or" is used inclusively herein so that multi-media content stored on either of the first or second digital download kiosks includes: (i) multi-media content stored only on the first digital download kiosk, (ii) multi-media content stored only on the second digital download kiosk, and (iii) multi-media content stored on both of the first and the second digital download kiosks.

The step of retrieving the requested multi-media content from the second digital download kiosk may be implemented in a peer-to-peer manner, for example, using an IP network.

The method may include the step of receiving and authenticating payment from the customer prior to the step of retrieving digital rights management data from a remote authorization database.

The method may comprise the further steps of: accessing the remote authorization database to retrieve new multi-media content; implementing a distribution criterion to transfer some multi-media content (in the form of multi-media packages) from the first digital download kiosk to the second digital download kiosk to ensure that the first digital download kiosk has sufficient storage space to receive the new multi-media content; and downloading the new multi-media content to the first digital download kiosk.

The distribution criterion may comprise one or more of the following: locating all multi-media content of the same genre on the same digital download kiosk, locating all new releases on the same multi-media kiosk; locating all multi-media content having the same characters (such as actors or fictional characters) on the same digital download kiosk; distributing the most popular multi-media content across all of the digital download kiosks; locating all multi-media content from the same source (for example, from the same studio or the same production company) on the same digital download kiosk; locating the newest multi-media content on the same digital download kiosk; and the like.

By virtue of these aspects, a catalogue of multi-media content can be provided on a network of digital download kiosks without requiring a content server, thereby freeing up valuable retail real estate.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
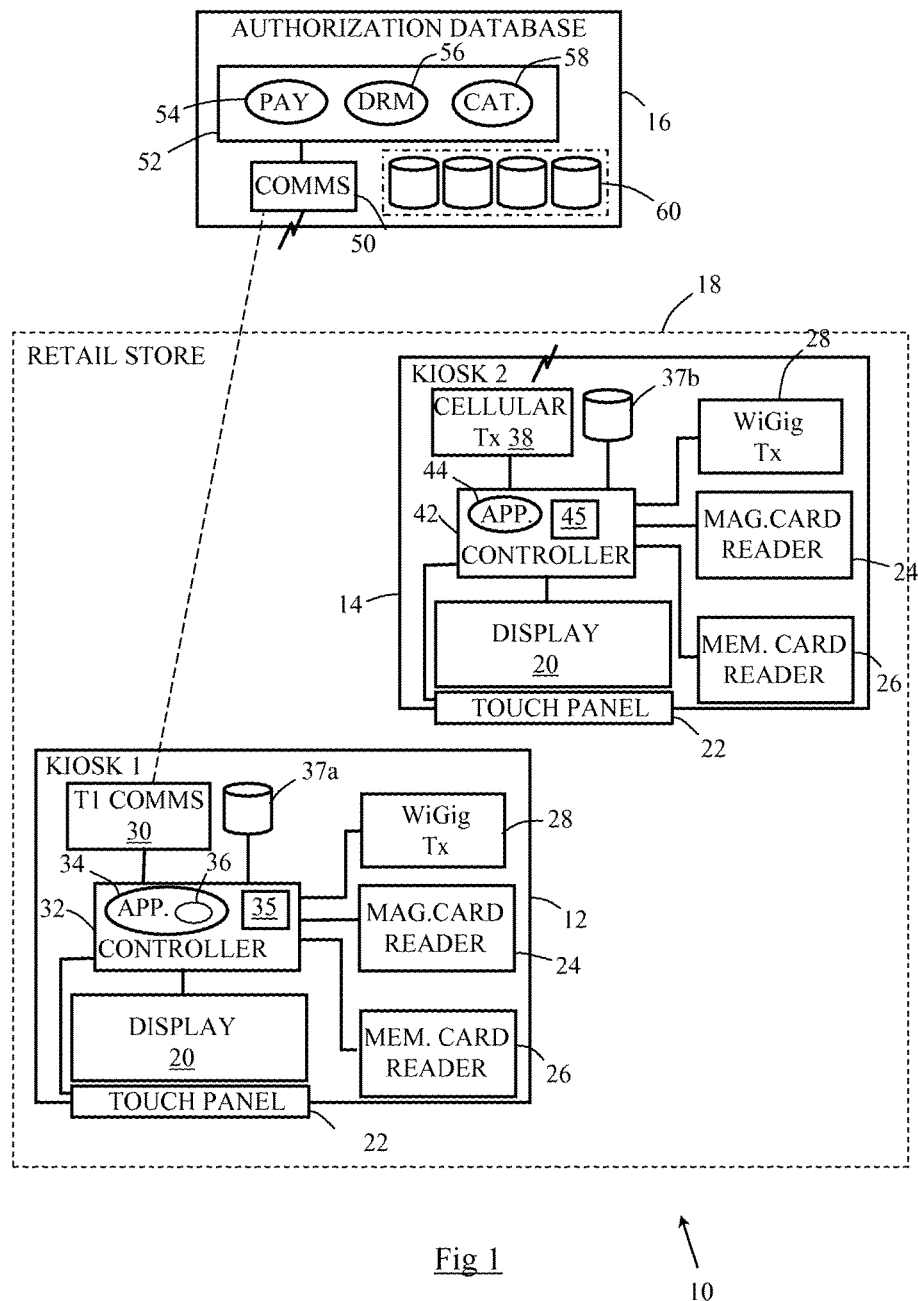
FIG. 1 is a simplified schematic diagram of a digital download kiosk system enabling storage of multi-media content therein according to one embodiment of the present invention.

Reference is first made to FIG. 1, which is a simplified schematic diagram of a digital download kiosk system 10. The system 10 comprises a first and second digital download kiosk 12,14 coupled to a remote authorization database 16 (also referred to as a remote authorization and master content database).

The first and second digital download kiosks 12,14 are located within a retail establishment (illustrated by broken line 18). The retail establishment 18 is illustrated to provide context, but is not part of the system 10.

The first digital download kiosk 12 comprises: a customer display 20, a touch sensitive panel 22 in registration with the display 20, a swipe magnetic card reader 24 for reading a payment card (such as a debit or credit card), a memory card reader/writer 26, a 60 GHz transceiver 28 (in the form of a WirelessHD/WiGig transceiver, available from SiBEAM, Inc., of 555 N. Mathilda Avenue, Sunnyvale, Calif. 94085), a T1 communications connection 30, and a controller 32 for controlling the operation of the various components within the kiosk 12. The controller 32 executes a control application 34, which is used to control the operation of the kiosk 12 and to access a catalogue 35, as will be described in more detail below.

The control application 34 includes a content management component 36. As will be described in more detail below, the content management component 36 is responsible for allocating newly-received (from the authorization database 16) multi-media content across the digital download kiosk system 10.

The first digital download kiosk 12 also comprises a local data store 37a for storing multi-media content.

In this embodiment, the memory card reader/writer 26 is an SD FLASH card reader/writer for reading secure portable storage devices (in the form of SDHC FLASH cards).

The second digital download kiosk 14 is configured in a very similar manner to the first digital download kiosk 12. Identical components are referenced using the same numerals as for the first digital download kiosk 12.

The second digital download kiosk 14 comprises: a customer display 20, a touch sensitive panel 22 in registration with the display 20, a swipe magnetic card reader 24 for reading a payment card (such as a debit or credit card), a memory card reader/writer 26, a 60 GHz transceiver 28, a cellular transceiver 38, and a controller 42 for controlling the operation of the various components within the kiosk 12. The controller 42 executes a control application 44, which is used to control the operation of the kiosk 14 and to access a catalogue 45, as will be described in more detail below.

The second digital download kiosk 14 also comprises a local data store 37b for storing multi-media content.

The authorization and master content database 16 comprises a communications facility 50 for communicating with the T1 communications connection 30 in the first kiosk 12, and the cellular transceiver 38 in the second kiosk 14, and a processor 52. The processor 52 executes: a payment authorization application 54, a digital rights management (DRM) issuance and tracking application 56, and a multi-media inventory application 58. These applications 54,56,58 will be described in more detail below. The authorization database 16 also comprises a large data repository 60 (tens of Terabytes) storing an entire catalogue of multi-media packages that can be transferred to the first digital download kiosk 12 or indirectly to the second kiosk 14.

Figure 2:
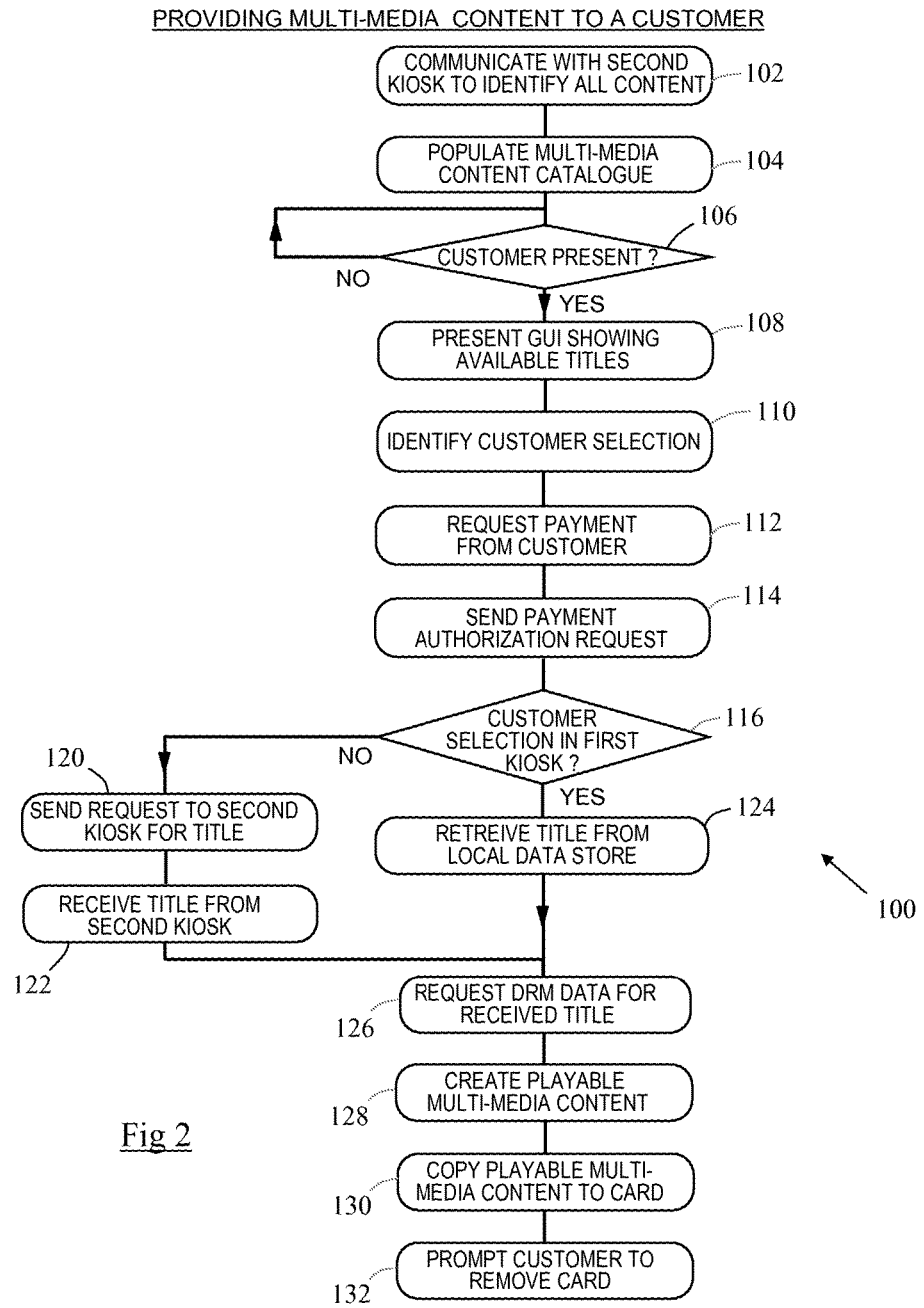
FIG. 2 is a flowchart illustrating steps implemented by or at part (two digital download kiosks) of the system of FIG. 1 in providing multi-media content in playable form to a customer.

Reference will now be made to FIG. 2, which is a flowchart 100 illustrating steps implemented by or at the two digital download kiosks 12,14 in providing multi-media content in playable form to a customer of one of the kiosks 12,14.

Initially, the first kiosk 12 communicates with the second kiosk 14 (via the two 60 GHz transceivers 28) to retrieve information about the multi-media content stored on the data store 37b of the second kiosk 14 and to provide information to the second kiosk 14 about the multi-media content stored on its own data store 37a (step 102).

Once the first kiosk 12 has received this information, the control application 34 populates the catalogue 35 to include titles of the multi-media packages stored within the local data store 37a and titles of the multi-media packages stored within the data store 37b in the second kiosk 14 (step 104). The control application 44 in the second kiosk 14 performs a similar function to update its catalogue 45.

The first and second kiosks 12,14 are then ready to serve customers.

In this example, a customer uses the first kiosk 12 to purchase a movie.

The control application 34 (in the first kiosk 12) waits for a customer to commence a transaction by touching any point on the touch panel 22 (step 106).

Once a customer commences a transaction, the control application 34 presents a graphical user interface (GUI) to the customer on the display 20 illustrating titles available for download (step 108). These titles are stored in either the first kiosk 12 or the second kiosk 14.

The customer browses through the titles presented on the GUI by touching menu options that provide various search criteria (date released, genre, viewer classification, customer rating, popularity, and the like) until a desired title is presented. The customer then selects this title, which the control application 34 detects (step 110).

The control application 34 then requests payment for this title (the amount may depend on whether the customer desires to buy or rent the title) from the customer (step 112).

The customer swipes a payment card (such as a credit or debit card) through magnetic card reader 24, and the control application 34 sends a payment authorization request to the payment authorization application 54 (step 114).

Once payment has been authorized (or simultaneously with sending the payment authorization request), the control application 34 ascertains the location of the selected title (that is, whether the selected title is in the data store 37a or in the data store 37b) (steps 116).

If the selected title is in the second kiosk 14 (that is, not the kiosk 12 that the customer is using), then the control application 34 sends a request to the second kiosk 14 for the title (step 120). The second kiosk 14 sends this title to the first kiosk 12 via the two 60 GHz transceivers 28, which the first kiosk 12 receives (step 122).

Returning to step 116, if the selected title is in the first kiosk 12 then the control application retrieves the title from the data store 37a (step 124).

Regardless of whether the title was transferred from the second kiosk 14 or retrieved from the data store 37a in the first kiosk 12, the following steps are the same.

The control application 34 requests DRM data for the selected title (which was either transferred from the second kiosk 14 or retrieved from the local data store 37a) from the DRM issuance and tracking application 56 in the remote authorization database 16 (step 126). This request is sent via the T1 communications connection 30.

The control application 34 then applies the received DRM data to the retrieved title (that is, the multi-media content retrieved either in step 122 or step 124) to create playable multi-media content (step 128). The retrieved multi-media content will typically have its DRM settings configured so that the content cannot be viewed or copied. By applying the received DRM data to this multi-media content, the DRM settings will be reconfigured so that the content will be viewable for at least a period of time (if rented) or indefinitely (if purchased). The DRM issuance and tracking application 56 keeps a log of the DRM rights requested and issued so that payment can be made to the owners of the rights in the multi-media content.

The control application 34 then copies the playable multi-media content to a portable storage device (in this embodiment an SDHC FLASH memory card) (step 130) inserted by the customer into the memory card reader/writer 26.

The control application 34 then uses the GUI to prompt the customer to remove his/her FLASH memory card (step 132) from the memory card reader/writer 26.

The customer then leaves with playable multi-media content (the selected title) on his/her FLASH memory card.

Figure 3:
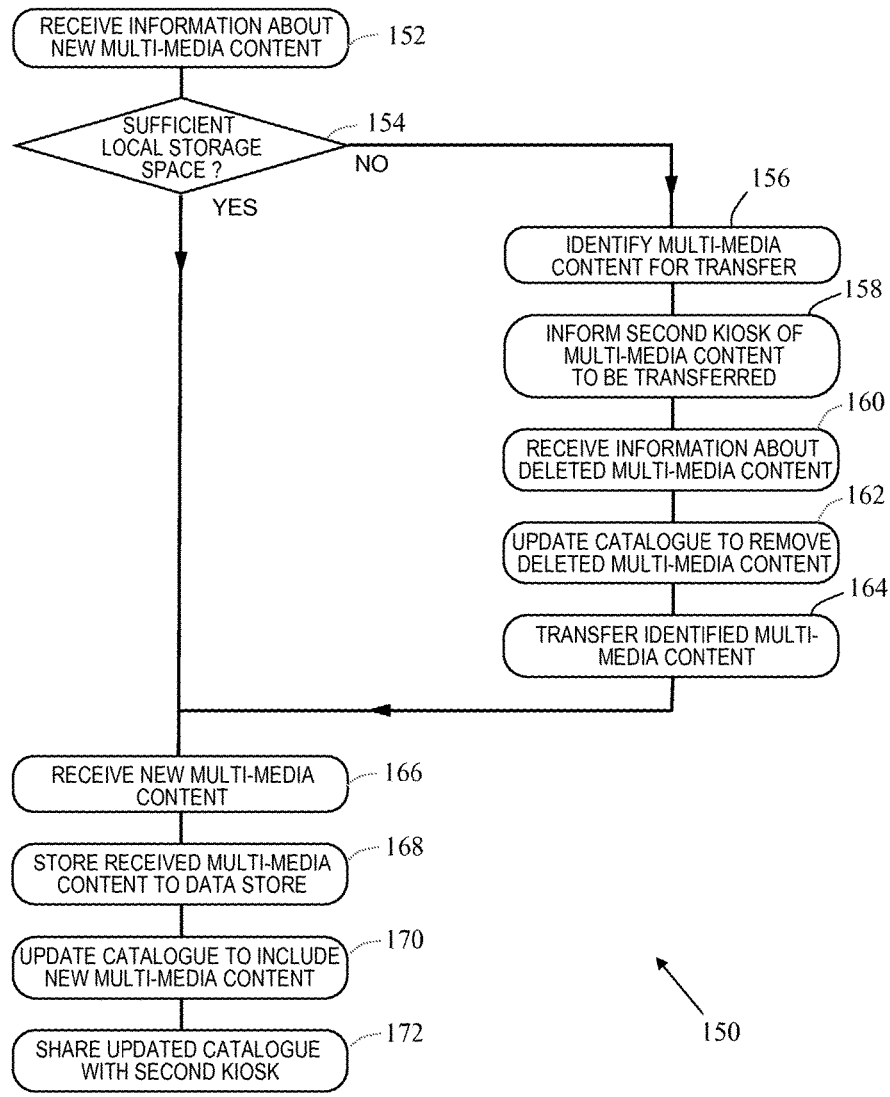
FIG. 3 is a flowchart illustrating steps implemented by or at two digital download kiosks of the system of FIG. 1 in updating multi-media content stored in those kiosks.

A method of updating multi-media content stored in the first and second kiosks 12,14 in the digital download kiosk system 10 will now be described with reference to FIG. 3, which is a flowchart 150 illustrating the steps implemented by or at those two kiosks 12,14.

Initially, the first kiosk 12 receives information from the authorization database 16 about new multi-media content to be transferred therefrom (step 152).

The control application 34 in the first kiosk 12 then uses the content management component 36 to ascertain if there is sufficient storage space within the local data store 37a to store all of the new multi-media content (step 154).

If the content management component 36 ascertains that there is insufficient storage space within the local data store 37a to store all of the new multi-media content, then the content management component 36 identifies multi-media content currently stored on the local data store 37a for transfer to the second kiosk 14 (step 156).

The content management component 36 retains information about every title downloaded by a customer (at all kiosks 12,14 in the digital download kiosk system 10). This is implemented by each kiosk 12,14 providing the control application 34 with information about each title (that is, multi-media content) purchased (or rented) as that title is provided to a customer.

The content management component 36 implements a distribution criterion algorithm to manage which kiosk 12,14 stores what multi-media content, and what multi-media content is to be deleted from the kiosks 12,14 in the event of insufficient storage space on the kiosks 12,14.

In this embodiment, the distribution criterion algorithm stores all new multi-media content on the local store 37a if there is sufficient storage space. If there is insufficient storage space, then the content management component 36 transfers the (chronologically) oldest titles stored on the local data store 37a to the data store 37b on the second kiosk 14 until there is sufficient space for the new titles.

Thus, in this embodiment, the identification step (which is step 156) involves identifying the chronologically oldest titles stored on the local data store 37a, and ascertaining which of these oldest titles have to be transferred to free up sufficient space to allow the new multi-media content to be stored on the local data store 37a.

The next step is for the content management component 36 to send a message (via the control application 34, and the two 60 GHz transceivers 28) to the control application 44 in the second kiosk 14, informing the control application 44 about the multi-media content that is to be transferred (step 158).

The control application 44 in the second kiosk 14 receives this message and deletes the oldest multi-media content stored on the data store 37b until there is sufficient space to store the multi-media content to be transferred from the first kiosk 12.

The control application 44 in the second kiosk 14 then sends a message to the control application 34 about the identity of the multi-media content that was deleted, which message is received by the control application 34 (step 160).

The control application 34 updates the catalogue 35 to remove the deleted multi-media content (step 162).

The content management component 36 then transfers the identified multi-media content from the data store 37a to the second kiosk 14 (step 164) for storage on the data store 37b therein.

The following steps occur at this stage if there was insufficient storage space on the data store 37a, or occur immediately after step 154 if there was sufficient storage space on the data store 37a.

The control application 34 receives the new multi-media content (step 166), and then stores the newly-received multi-media content (representing new titles) in the local data store 37a (step 168).

The control application 34 then updates the catalogue 35 to include the newly-received multi-media content (step 170) as titles available for download by a customer.

The control application 34 also shares the updated catalogue 35 with the control application 44 (step 172), which saves it as catalogue 45.

It should now be appreciated that this embodiment allows multi-media content to be distributed across a network of kiosks in a peer-to-peer manner so that the kiosks combine to provide a catalogue of titles that are stored within the network. This avoids the need for a content server for the kiosks. By routing new multi-media through one kiosk, expensive high bandwidth communications channels are not required for each kiosk.

Various modifications may be made to the above described embodiment within the scope of the invention, for example, in other embodiments, more than two kiosks may be connected in a peer-to-peer network so that multi-media content can be shared across a large number of kiosks.

In other embodiments, a wireless transceiver may be used instead of, or in addition to, the T1 connection 30 in the first kiosk 12. The wireless transceiver may be a cellular radiofrequency transceiver.

In other embodiments, the payment authorization application 54 may not be implemented by the authorization database 16; instead, a kiosk 12,14 may connect to the same payment authorization application that is used by the retail establishment to authorize payments made at the point of sale terminal.

In other embodiments, the content management component may be provided as a stand-along content management application, rather than as part of the control application 34.

In other embodiments, only one catalogue may be provided that is shared across all of the kiosks.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A digital download kiosk network comprising:
an authorization database including a digital rights management facility, the authorization database distributing multi-media content to at least one digital download kiosk;
a first digital download kiosk comprising a first storage storing multi-media content and configured for purchase or rental from the first digital download kiosk and the multi-media content configured for delivery from the first storage, the first digital download kiosk coupled to the authorization database through a high-bandwidth network connection and receiving digital rights management data from the authorization database, and the first digital download kiosk including a first touch-sensitive display configured to provide a first input mechanism to a consumer, and the first digital download kiosk including a first card reader configured to read a first payment card provided by the consumer, wherein the first digital download kiosk further includes a first flash memory card reader/writer and a first T1 communications connection;
a second digital download kiosk comprising a second storage storing multi-media content and configured for purchase or rental from the second digital download kiosk and the multi-media content configured for delivery from the second storage, the second digital kiosk coupled to the authorization database through another cellular connection and receiving digital rights management data from the authorization database, and wirelessly coupled to the first digital download kiosk in a peer-to-peer manner employing a first wireless transceiver in the first digital download kiosk and a second wireless transceiver in the second digital download kiosk, and utilizing the first and second wireless transceivers to share multi-media content therebetween, and the second digital download kiosk including a second touch-sensitive display configured to provide a second input mechanism to the consumer, and the second digital download kiosk including a second card reader configured to read a second payment card provided by the consumer, and wherein the first digital download kiosk managing the first storage utilizing the second storage of the second digital download kiosk through a peer-to-peer network connection between the first digital download kiosk and the second digital download kiosk avoiding utilization of a content server by the first digital download kiosk and the second digital download kiosk utilizing, and wherein when a particular piece of content is requested by the consumer from the first digital download kiosk, the particular piece of content resided in the second storage of the second digital download kiosk and the consumer is unaware of the particular piece of content being in the second storage, and wherein the second digital download kiosk further includes a second flash memory card reader/writer and a second T1 communications connection;
additional digital download kiosks coupled to the first and second digital download kiosks to increase storage space of the first and second digital download kiosks as needed, wherein the first digital download kiosk, the second digital download kiosk, and the additional digital download kiosk interact and operate with one another without the content server and without any other server while maintaining a content catalogue for the multi-media content on each of the digital download kiosks; and a content management application configured to execute on the first digital download kiosk, the content management application is executed and is further configured to perform processing to: i) allocate newly-received multi-media content available from the authorization database between the first digital download kiosk, the second digital download kiosk, and the additional digital download kiosk, ii) determine whether local storage on the first digital download kiosk is sufficient to receive newly-received multi-media content and when there is insufficient local storage transferring select existing multi-media content from the local storage to one of the second digital download kiosk and the additional digital download kiosk to make room in the local storage for the newly-received multi-media content, and iii) process a distribution criterion algorithm that manages the local storage and storages of the second digital download kiosk and the additional digital download kiosk to determine when specific multi-media content is to be deleted and to determine where each multi-media content is to be stored between the local storage and the storages of the second digital download kiosk and the additional digital download kiosk;
wherein the first flash memory card reader/writer and the second flash memory card reader/writer configured to write purchased multi-media content with purchased digital rights onto consumer-inserted memory cards at the first and second digital download kiosks.

2. A digital download kiosk network according to claim 1, wherein each of the first and second digital download kiosks includes a catalogue listing multimedia content available at any digital download kiosk in the digital download kiosk network.

3. A digital download kiosk network according to claim 1, wherein the authorization database is located remotely from the first and second digital download kiosks.

4. A digital download kiosk network according to claim 1, wherein the first digital download kiosk is coupled to the authorization database by a permanent connection and the second digital download kiosk is coupled to the authorization database by a dial-up connection.

5. A digital download kiosk network according to claim 4, wherein the first digital download kiosk receives all new multi-media content for both the first digital download kiosk and the second digital download kiosk and deletes old multi-media content to make sufficient space for the new multi-media content.

6. A digital download kiosk network according to claim 4, wherein the first digital download kiosk is configured to receive all new multi-media content and transfers some old multi-media content to the second digital download kiosk to make space for the new multi-media content.

7. A digital download kiosk network according to claim 1, wherein the first and second wireless transceivers are mutually coupled using a high speed short range transceivers.

8. A digital download kiosk network according to claim 1, wherein the second kiosk provides information to the first kiosk identifying the multi-media content stored in the second storage utilizing the second wireless transceiver; and
wherein the first kiosk is configured to receive a request for multi-media content, determine whether the requested multi-media content is located in the first storage or the second storage, and retrieve the requested multi-media content from the determined location; and wherein the first kiosk receives digital rights management data corresponding to the requested multi-media content from the authorization database.

9. The digital download kiosk network of claim 8, wherein the authorization database-distributes multi-media content to the first kiosk.

10. The digital download kiosk network of claim 9, wherein the first kiosk sends the distributed multi-media content to the second kiosk for storage in the second storage in an instance in which the first storage has insufficient capacity for the distributed multi-media content.

11. The digital download kiosk network of claim 9, wherein the first kiosk sends multi-media content stored in the first storage to the second kiosk for storage in the second storage in an instance in which the first storage has insufficient capacity for the distributed multi-media content; and
   wherein the first kiosk stores the distributed multi-media content in the first storage.

12. The digital download kiosk network of claim 1, wherein the multi-media content comprises a movie, an audio file, or a video game.

13. The digital download kiosk network of claim 8, wherein the multi-media content comprises a movie, an audio file, or a video game.

14. The digital download kiosk network of claim 7, wherein the first and second wireless transceivers are at least 60 GHz transceivers.

15. The digital download kiosk network of claim 1, wherein the first digital download kiosk is coupled to the authorization database through the first T1 communications connection.

* * * * *